US010213735B2

(12) United States Patent
Serra Alfaro et al.

(10) Patent No.: US 10,213,735 B2
(45) Date of Patent: Feb. 26, 2019

(54) CATALYTIC LAYER AND USE THEREOF IN OXYGEN-PERMEABLE MEMBRANES

(71) Applicants: CONSEJO SUPERIOR DE INVESTIGACIONES CIENTIFICAS (CSIC), Madrid (ES); UNIVERSITAT POLITECNICA DE VALENCIA, Valencia (ES)

(72) Inventors: Jose Manuel Serra Alfaro, Valencia (ES); Julio Garcia Fayos, Valencia (ES); Laura Navarrete Algaba, Valencia (ES); Vicente Bernardo Vert Belenguer, Valencia (ES)

(73) Assignees: Consejo Superior de Investigaciones Cientificas (CSIC), Madrid (ES); Universitat Politecnica de Valencia, Valencia (ES)

( * ) Notice: Subject to any disclaimer, the term of this patent is extended or adjusted under 35 U.S.C. 154(b) by 76 days.

(21) Appl. No.: 15/388,550

(22) Filed: Dec. 22, 2016

(65) Prior Publication Data
US 2017/0100697 A1    Apr. 13, 2017

Related U.S. Application Data

(63) Continuation of application No. PCT/ES2015/070505, filed on Jun. 30, 2015.

(30) Foreign Application Priority Data

Jul. 1, 2014 (ES) .................................. 201430991

(51) Int. Cl.
*B01D 53/22* (2006.01)
*C01B 13/02* (2006.01)
(Continued)

(52) U.S. Cl.
CPC .......... *B01D 53/228* (2013.01); *B01D 53/22* (2013.01); *B01D 67/0088* (2013.01);
(Continued)

(58) Field of Classification Search
CPC .............. B01D 69/145; B01D 67/0088; B01D 2325/02; B01D 69/10; B01D 53/228;
(Continued)

(56) References Cited

U.S. PATENT DOCUMENTS 9,873,108 B2 * 1/2018 Majima .................... B01J 23/80
2004/0009349 A1 * 1/2004 Brotzman, Jr. .......... B01J 2/006
428/379
(Continued)

OTHER PUBLICATIONS

Luo, et al., "C02-Stable and Cobalt-Free Dual-Phase Membrane for Oxygen Separation", Angew. Chem. Int. Ed., 2011, 50, pp. 759-763.
(Continued)

*Primary Examiner* — Anthony R Shumate
(74) *Attorney, Agent, or Firm* — Caesar Rivise, PC

(57) ABSTRACT

The invention relates to a catalytic activation layer for use in oxygen-permeable membranes, which can comprise at least one porous structure formed by interconnected ceramic oxide particles that conduct oxygen ions and electronic carriers, where the surface of said particles that is exposed to the pores is covered with nanoparticles made from a catalyst, the composition of which corresponds to the following formula:
$A_{1-x-y}B_xC_yO_R$ where: A can be selected from Ti, Zr, Hf, lanthanide metals and combinations thereof; B and C are metals selected from Al, Ga, Y, Se, B, Nb, Ta, V, Mo, W, Re, Mn, Sn, Pr, Sm, Tb, Yb, Lu and combinations of same; and A must always be different from B. $0.01 < x < 0.5$; $0 < y < 0.3$.

16 Claims, 3 Drawing Sheets

(51) Int. Cl.
| | |
|---|---|
| *B01D 67/00* | (2006.01) |
| *B01D 69/10* | (2006.01) |
| *B01D 69/14* | (2006.01) |
| *B01D 71/02* | (2006.01) |
| *B01J 23/10* | (2006.01) |
| *B01J 23/755* | (2006.01) |
| *B01J 35/00* | (2006.01) |
| *B01J 35/04* | (2006.01) |
| *B01J 37/02* | (2006.01) |
| *B01J 37/04* | (2006.01) |
| *B01J 37/08* | (2006.01) |
| *F23L 7/00* | (2006.01) |
| *B01D 69/02* | (2006.01) |
| *B01D 69/12* | (2006.01) |
| *C04B 35/50* | (2006.01) |

(52) U.S. Cl.
CPC ............ *B01D 69/02* (2013.01); *B01D 69/10* (2013.01); *B01D 69/12* (2013.01); *B01D 69/145* (2013.01); *B01D 71/024* (2013.01); *B01D 71/028* (2013.01); *B01J 23/10* (2013.01); *B01J 23/755* (2013.01); *B01J 35/0006* (2013.01); *B01J 35/04* (2013.01); *B01J 37/0219* (2013.01); *B01J 37/0244* (2013.01); *B01J 37/04* (2013.01); *B01J 37/088* (2013.01); *C01B 13/02* (2013.01); *C01B 13/0255* (2013.01); *C01B 13/0288* (2013.01); *C04B 35/50* (2013.01); *F23L 7/007* (2013.01); *B01D 67/0041* (2013.01); *B01D 67/0044* (2013.01); *B01D 67/0072* (2013.01); *B01D 67/0083* (2013.01); *B01D 2323/12* (2013.01); *B01D 2325/02* (2013.01); *B01D 2325/04* (2013.01); *B01D 2325/10* (2013.01); *B01D 2325/22* (2013.01); *B01D 2325/28* (2013.01); *C01B 2210/0007* (2013.01); *C01B 2210/0012* (2013.01); *C04B 2235/3224* (2013.01); *C04B 2235/3229* (2013.01); *C04B 2235/79* (2013.01)

(58) Field of Classification Search
CPC ............ B01D 2325/10; B01D 2325/04; B01D 71/024; F23L 7/007; C01B 2210/0012; C01B 13/0288; C01B 2210/0007; B01J 23/10; B01J 37/088; B01J 37/0244; B01J 35/0006; B01J 37/04; B01J 37/0219; B01J 35/04; B01J 23/755
See application file for complete search history.

(56) References Cited

U.S. PATENT DOCUMENTS

| | | | |
|---|---|---|---|
| 2005/0250859 A1* | 11/2005 | Nonninger | B01D 71/02 516/33 |
| 2007/0075052 A1* | 4/2007 | Fanson | B01J 23/002 219/121.52 |
| 2008/0290318 A1* | 11/2008 | van Veggel | B82Y 20/00 252/301.4 F |
| 2009/0235625 A1* | 9/2009 | Bansal | B01D 53/228 55/524 |
| 2009/0241496 A1* | 10/2009 | Pintault | B01D 67/0048 55/524 |
| 2009/0255867 A1* | 10/2009 | Nonninger | B01D 63/082 210/601 |
| 2009/0311513 A1* | 12/2009 | Hu | C23C 14/083 428/323 |
| 2011/0084326 A1* | 4/2011 | Dickerson | B82Y 10/00 257/296 |
| 2013/0015122 A1* | 1/2013 | Awadh | B82Y 30/00 210/500.21 |
| 2013/0277300 A1* | 10/2013 | Nunes | B01D 69/02 210/500.25 |
| 2014/0099441 A1* | 4/2014 | Jeong | D01D 5/00 427/237 |
| 2014/0209533 A1* | 7/2014 | Matviychuk | B01D 71/028 210/500.25 |
| 2015/0273402 A1* | 10/2015 | Kim | B01D 71/024 96/4 |
| 2015/0303449 A1* | 10/2015 | Cho | C25B 1/00 429/218.1 |
| 2016/0038885 A1* | 2/2016 | Hogen-Esch | B01D 69/148 210/321.6 |
| 2016/0229969 A1* | 8/2016 | Wiesner | B01D 71/80 |

OTHER PUBLICATIONS

Garcia-Fayos, et al., Oxgen Transport Membranes in a Biomass/Coal Combined Strategy for Reducing CO2 Emissions: Permeation Study of Selected Membranes Under Different CO2-Rich Atmospheres, Cataysis Today, 257 (2015) 221-228.
Balaguer, et al., Fast Oxygen Separation Through SO2-and CO2-Stable Dual-Phase Membrane Based on NiFe2O4—Ce0.8Tb0.2O2-δ, Chemistry of Materials, 25, (2013) 4986-4993.
Gaudillere, et al., Enhanced Oxygen Separation through Robust Freeze-Cast Bilayered Dual-Phase Membranes, ChemSusChem, 7, (2014) 2554-2561.
Lobera, et al., "Rare Earth-doped Ceria Catalysts for Odhe Reaction in a Catalytic Modified MIEF Membrane Reactor", ChemCatChem, 4, (2012) 2102-2111.
International Search Report for corresponding PCT Application No. PCT/ES2015/070505 dated Sep. 25, 2015.

* cited by examiner

CATALYTIC LAYER AND USE THEREOF IN OXYGEN-PERMEABLE MEMBRANES

This bypass continuation application claims priority under 35 U.S.C. § 120 of International Application PCT/ES2015/070505, filed Jun. 30, 2015, which in turn claims the benefit of ES P201430991, filed Jul. 1, 2014, and all of whose disclosures are incorporated by reference herein in their entireties.

FIELD OF THE INVENTION

The present invention pertains to the field of gas separation membranes. Specifically, it relates to a new catalytic activation layer and its use in an oxygen-permeable membrane based on ion conductive ceramic materials at high temperatures and resistant to operation in the presence of $CO_2$ and other acid gases as $SO_2$. Therefore, its use is mainly aimed at oxycombustion processes wherein an comburent (oxygen) enriched flow is used to obtain high flame temperatures, to improve combustion or to avoid contacting $N_2$ with the process products. An example is the use in thermal power plants in which oxycombustion gases can be used as entrainment current in the membrane module. This concept of thermal power plant makes it possible to reduce to a minimum $CO_2$ and $NO_x$ emissions.

STATE OF THE ART PRIOR TO THE INVENTION

Oxy-combustion consists in the use of a high-purity $O_2$ stream as comburent instead of air, as is done in conventional combustion processes, thereby achieving higher flame temperatures with lower fuel consumption and thus improving the combustion. The use of oxygen-rich comburents makes it possible to obtain combustion gases with a composition consisting mainly of $CO_2$ and water steam. The high $CO_2$ concentration of the exhaust gases in the oxy-combustion process facilitates the potential separation of the same. In fact, this oxy-combustion process in thermal or intensive energy plants makes it possible to produce electrical energy or industrial products from fossil fuels by minimizing the emission of $CO_2$, being technologically and economically feasible thanks to its integration with capture and $CO_2$ storage technologies. These processes have high energy efficiencies, what reduces fuel consumption and reduces the size of industrial units and equipment. Likewise, in the case of combustion only with oxygen instead of air, and not feeding $N_2$ to the furnace, reactor or boiler, it is possible to considerably reduce the $NO_x$ emissions. Therefore, this process has the advantage of facilitating the $CO_2$ separation and capture, which can subsequently be liquefied, conveyed and stored, or used in other industrial processes. This combustion process concept allows to minimize $CO_2$ and $NO_x$ emissions, as well as to substantially increase the energy efficiency of the process. Examples of intensive industries in the use of energy that require the use of oxygen are the glass industry, incinerator plants, frits manufacturing, glazes, paining industry and metallurgy, steel, chemical, refining and petrochemical industries, enamels and ceramic colors. One of the industrial sectors in which the use of oxygen makes oxy-combustion possible is the melting of glass and the manufacture of frits, enamels and ceramic colors. In this type of industries, the need to reach temperatures above 1500° C. inside the furnaces, in order to melt the mixture of raw materials that is introduced, is achieved using oxygen instead of air in the natural gas burners.

Essentially, oxy-combustion consists of the combustion of a fuel with oxygen. The oxygen which is fed to the furnace, the reactor or the boiler, under conditions of high purity, is previously obtained by a separation process of oxygen from the air.

Oxygen membranes can also be applied in air enrichment, therefore the oxygen concentration of 21% is raised to higher values, typically above 24%. This increase in concentration is necessary in certain combustion or chemical conversion processes in which the calorific power of the product to be treated, generally a fuel, is insufficient to maintain adequate operating conditions. A typical example of enrichment is the use in cement plants that use alternative fuels or that incinerate residues during the clinker manufacturing.

Oxy-combustion aims to be one of the most economical technologies for the capture of $CO_2$, being its main drawback the need of high $O_2$ demand and the cost involved in obtaining this $O_2$. The great challenge of this technology lies in the $O_2$ production in order to achieve the supply of the high amounts thereof that are required.

Currently, the only available technologies on an industrial scale capable of producing large $O_2$ volumes are the cryogenic distillation of air, and absorption facilities in columns of solid absorbers (PSA-VPSA), the later with lower production and generation capacities, with lower oxygen purities, generally less than 95% by volume. The drawback of cryogenic distillation of air is its high energy consumption. In the case of a thermal power plant, this consumption can reach 15% of its electricity production, penalizing the overall efficiency of the plant by 10%. A very interesting alternative with which it is expected to reduce the overall loss of efficiency in the oxycombustion plant up to 5% is the use of dense ceramic membranes based on conductive materials of oxygen ion, that allow to separate oxygen at high temperature with a 100% theoretical purity. The transport of oxygen through the membranes requires temperatures above 600° C. to achieve technically competitive permeabilities. The transport of the oxygen ion is simultaneous to the transport of electrons or electron gaps (electronic carriers), consequently the material must possess sufficient electronic conductivity under the operating conditions of the membrane. The driving force responsible for transporting oxygen through the membrane is the difference in oxygen partial pressure between both sides of the membrane. Thus, oxygen flow through a membrane is determined by the temperature and the partial pressure difference of the oxygen in addition to the thickness of the membrane.

Another crucial step in the process of oxygen separation in ionic transport membranes is the gas exchange. As it was mentioned, the transport through the selective separation layer consists of the diffusion of oxygen ions and electronic carriers. Therefore, two surface reactions are necessary, a first one in which the oxygen gas is adsorbed and transformed into oxygen ions on the surface of the membrane exposed to the feed gases, generally compressed air, and a second one, in which the oxygen ions are transformed into molecular oxygen and desorbed. For various reasons, these transport steps may be limiting and cause a decrease in permeation flux across the membrane. Among the different possible reasons, we can highlight: (1) the thickness of the selective separation layer is very small, so diffusion through the solid is much faster than the gas exchange. Typically, this critical dimension is called the "characteristic length" and is the quotient between the diffusion coefficient and the kinetic constant of the superficial gaseous exchange reaction, under the conditions of operation and composition of gases in contact with the membrane surface. (2) The membrane surface does not have significant catalytic activity for the oxygen activation reaction. (3) The gaseous atmospheres in contact with the membrane surface or surfaces disfavor the adsorption/desorption of the molecular oxygen and its evolution through the reaction $O_2+2e^- \leftrightarrow O^{-2}$. In processes that are relevant from an industrial point of view, both the permeate and the feed tend to have significant amounts of acid gases such as $CO_2$ and $SO_2$, which make the reaction difficult because they passivate or inactivate the surface and compete with the adsorption and reaction centers involved in the gaseous oxygen exchange reaction. This damaging effect is accentuated as the operating temperature of the process is lowered, especially below 850° C., and when the concentration of $SO_2$ and $CO_2$ is increased. The effect of $SO_2$ gas is especially negative is, since concentrations above 5 ppm produce severe effects on membrane permeation and produce irreversible degradations in many materials, which result in the permanent and irreparable damage of the membrane.

The pressure difference between both sides of the membrane can be achieved by two actions: (a) increasing the air pressure through compression stages; and/or (b) by lowering the oxygen partial pressure, what is possible by applying vacuum or by diluting the oxygen in the permeate by an entrainment gaseous stream. This last option usually consists of recirculating the exhaust gases from the furnace or combustion boiler, increasing at the same time the operating temperature. Also, in line with the second option, it is possible to pass a reducing gas (usually methane or other hydrocarbons) which consumes the oxygen permeating through the membrane to give complete or partial combustion products and to directly release heat in contact with the ceramic membrane.

Sulfur is present to a greater or lesser extent in practically all fuels, depending on their origin, nature and previous refining and/or purification. Its combustion produces $SO_2$ in variable concentrations and it is usually in contact—in one way or another—with one or both surfaces of the membranes in combustion processes using membranes. Therefore, to ensure the stability and effectiveness in the oxygen production of these membranes in atmospheres containing $SO_2$, is a technological aspect to be taken into account for their industrial use.

FIG. 1 shows a diagram of a process having an oxy-combustion furnace and membrane module wherein oxygen is separated from compressed air by applying vacuum to the permeate part. In this process it is necessary to make a fuel supply to the compressed air to reach the necessary temperature for the compressed air to reach the necessary temperature for the operation of the module operation. In this process configuration it is necessary that the membrane operates properly in contact with the combustion gases (mainly $CO_2$, $H_2O$ and $SO_2$) mixed with air. In other processes, part of the combustion gases from the furnace, boiler or reactor are used as entrainment gas of the permeated oxygen, and in this case the $CO_2$, $H_2O$ and $SO_2$ concentration of the gases in contact with the membrane may be higher.

The non-porous selective separation layer in this type of dense ceramic membranes is generally composed of a mixed conductive material of electrons and solid-state oxygen ions with a structure of the perovskite family, including alkaline earth elements, rare earths and transition metals, such as iron and cobalt, in its crystalline structure. These oxides have oxygen deficiency in their structure and it is just the presence of vacant oxygen positions in their network what makes the mechanism of diffusion of the oxygen ion through the crystalline structure possible. The most commonly used materials for this application currently have crystalline structures of perovskite type, with compositions such as $La_{o.6}Sr_{o.4}Fe_{o.8}Co_{o.2}O_{3-\delta}$ or $Ba_{o.5}Sr_{o.5}Fe_{0.2}Co_{o.8}O_{3-\delta}$. However, the big problem of this type of materials is their low stability when being subjected for long time periods to oxygen concentration gradients and, mainly, to being subjected to the presence of $CO_2$ under the operating conditions, generally producing alkaline earth elements carbonates (carbonation phenomenon). Another type of ionic ceramic membranes are those formed by the mixture of two types of crystalline phases, one that predominantly carries oxygen ions and the other one which predominantly carries electrons or electron voids. For example, it has recently been reported that the combination of gadolinium-doped cerium oxide with a spinel, free of cobalt and alkaline-earth metal, such as $Fe_2NiO_4$, has given rise to a promising material with regard to its oxygen flow (J. Caro et al., Angewandte Chemie International Edition 2011, 50, 759.)

For their practical use, oxygen separation membranes at high temperature through ion transport are generally formed by the following components:

(i) A porous support, generally made of the same material as the separation layer (ii) or made of a material (ceramic or metallic) compatible with the separation layer. Compatible means that they have a similar expansion profile as a function of temperature and that no reaction takes place between the two phases at high temperatures to give rise to third phases, which generally result in degradation and rupture of the membrane. The support porosity is usually comprised between 20 and 60%, and its thickness is variable, typically below 2 mm.

(ii) A non-porous layer or film, preferably with a thickness of less than 150 µm, is placed on the porous support (i). This layer consists of oxides or mixtures of oxides and allows the simultaneous transport of oxygen ions and electronic carriers through it.

(iii) On the non-porous layer (ii) there is adhered a porous layer having a thickness preferably between 100 and 10 µm, made of a material having mixed ionic and electronic conductivity, as well as catalytic activity for oxygen adsorption/desorption and its dissociation and ionization. This catalytic layer allows to improve the processes of incorporation and elimination of gaseous oxygen.

FIG. 2 shows a diagram of a membrane wherein the architecture and sequence among (i), (ii) and (iii) are illustrated. The geometry of the membrane in the final module can be flat, tubular or any other complex geometry that enhances the performance of the module, i.e. thermo fluid dynamics, pressure resistance, heat exchange and proper sealing of the system.

In some cases, there is an additional porous catalytic layer (iv) between the porous support (i) and the non-porous separation layer (ii) which has the function of improving the gas exchange stages, especially when the porous support (i) does not have catalytic activity nor does it allow to carry out the transport of oxygen ions or electronic carriers. Generally, the properties of layer (iii) and layer (iv) are quite similar, although generally the surface specific area of layer (iii) is larger (superior). FIG. 3 shows a diagram of a membrane wherein the architecture and sequence between (i), (ii), (iii) and (iv) are illustrated.

Optionally another additional non-porous layer (v) may also be required. This layer would be located between the non-porous layer (ii) and the porous layer (iii), and would serve to protect layer (ii) against possible degradation interactions or degradation reactions in contact with layer (iii) or with operation gases in contact with the layer (iii). Layer (v) must allow the transport of oxygen ions and oxygen carriers while being thermo-chemically compatible with the adjacent layers and with the gases it is in contact with. FIG. 4 shows a diagram of a membrane wherein the architecture and sequence between (i), (ii), (iii), (iv) and (v) are illustrated.

FIG. 5 shows a scanning electron microscope image of an oxygen-permeable ceramic membrane having components (i), (ii) and (iii), as shown schematically in FIG. 1. FIG. 6 shows a scanning electron microscopy image of an oxygen-permeable ceramic membrane having components (i), (ii), (iii) and (v), the latter component being a composite material made of two crystalline phases, one conducting mainly oxygen ions and another one that drives mainly electronic carriers.

The present invention relates to a novel catalytic activation layer and to its incorporation into a catalytically activated oxygen membrane, thanks to said catalytic layer which allows efficient operation in the presence of acid gases such as $CO_2$ and $SO_2$. Thus, the present invention provides a solution for improving the oxygen permeation (permeate flow) of a membrane under severe operating conditions, similar to those of oxy-combustion, and therefore to overcome the disadvantages of the prior art; also employing materials which have a high chemical stability in contact with said gaseous streams.

DESCRIPTION OF THE INVENTION

The present invention relates to a catalytic activation layer for its use in oxygen-permeable membranes, which may comprise at least one porous structure formed by particles of ceramic oxides, said particles linked to each other, conducting oxygen ions and electronic carriers, wherein the surface of said particles exposed to the pores is coated with nanoparticles made from a catalyst whose composition has the following formula:

$$A_{1-x-y}B_xC_yO_R$$

wherein

A may be selected from Ti, Zr, H, lanthanide metals and combinations thereof, preferably Zr, Pr, Ce and combinations thereof;

B and C are metals selected from Al, Ga, Y, Sc, B, Nb, Ta, V, Mo, W, Re, Mn, Sn, Pr, Sm, Tb, Yb, Lu and combinations thereof, preferably Al, Ga, Y, Sc, Nb, Mo, W, Pr, Sm and combinations thereof;

A must always be different from B.

$0.01 \leq x \leq 0.5$;

$0 \leq y \leq 0.3$

In the present invention, "R" represents the molar content of oxygen, which is determined by the molar composition of the remaining metal elements of the compound. Considering the neutral electric charge of the compound, the oxygen anion content is necessary to compensate for the positive charge of the sum of all remaining metal cations.

Said catalytic activation layer may have a thickness preferably comprised between 5 and 100 µm, a porosity preferably comprised between 10 and 60%, and pores with an average size of preferably between 0.1 and 5 µm, and a catalyst content supported on the porous structure preferably between 0.5 and 10% by weight of said porous structure.

Also, the particles forming the porous structure may have an average grain size, preferably comprised between 0.2 and 5 µm.

By way of example, the following combinations of metals, Pr—Al and Ce—Pr have shown to be especially active. Other possible examples would be combinations such as Pr—Ga, Pr—Nb, Pr—W, Pr—Mo, Ce—Al, Ce—Y, Ce—Pr—Al, Cs—Sm—Al, Ce—Sm—Ga, etc.

According to a preferred embodiment of the invention, the porous structure may be formed of mixtures of particles having two different compositions and crystalline phases.

According to a particular embodiment, the porous structure is formed by mixtures of particles having two different crystalline compositions and phases:

a first phase which is made of partially substituted cerium oxide, preferably between 10-30% molar, by at least one element selected from Zr, Gd, Pr, Sm, Nd, Er, Tb and combinations thereof, preferably Gd, Sm, Tb and combinations thereof, and has crystalline structure of the florite type, and has an ionic conductivity greater than 0.001 S/cm under operating conditions;

a second phase comprising a mixed oxide with a spinel type structure, comprising at least one metal selected from Fe, Ni, Co, Al, Cr, Mn and combinations thereof, preferably Fe, Ni, Co, Mn and combinations thereof, and has a total conductivity greater than 0.05 S/cm under operating conditions.

In another particular embodiment of the invention, the porous structure is formed of mixtures of particles having two different compositions and crystalline phases:

a first phase comprising cerium oxide partially substituted (10-30% molar) by at least one element selected from Zr, Gd, Pr, Sm, Nd, Er, Tb and combinations thereof, preferably Gd, Sm, Tb and combinations thereof, and has a crystalline structure of the florite type, and has an ionic conductivity greater than 0.001 S/cm under operating conditions;

a second phase comprising a mixed oxide with perovskite type structure, comprising at least one metal selected from lanthanides, Fe, Ni, Co, Cr, Mn and combinations thereof, preferably among Fe, Mn and combinations thereof And has a total conductivity greater than 0.05 S/cm under operating conditions.

The present invention also relates to a process for the preparation of the porous catalytic layer described above. According to a preferred embodiment, the process of obtaining the catalytic activation layer may comprise at least one step of incorporating the catalyst into the surface of the porous structure particles by a technique selected from among impregnation or infiltration of liquid solutions of precursors of the metals comprised in the final catalyst composition; infiltration of a nanoparticle dispersion of the catalyst; deposition in vapor phase by PVD or CVD techniques, and combinations thereof.

This stage of catalyst incorporation could be carried out in 2 steps, i.e. introducing a first element (A), and then introducing at least one second element (B) or two further elements (B) and (C) using the techniques described above. It is common practice to carry out a heat treatment after incorporating the first element (A) and before incorporating another element (B). Making it in 2 steps may be advantageous in some cases since it may allow to modify or preferably promote the surface of nanoparticles of the A-based compound without producing any effect in the interior of said nanoparticles.

Furthermore, according to a particular embodiment, the process of obtaining a catalytic activation layer may further comprise a second heat treatment step at temperatures comprised between 650 and 1100° C.

As mentioned above, the catalytic activation layer of the present invention is used in oxygen-permeable membranes. Thus, another object of the present invention relates to an oxygen-permeable membrane, comprising said catalytic activation layer. It has been found that with this catalytic activation layer the membrane is especially effective because it substantially improves the gaseous exchange stages, which totally limit the permeation process in the presence of $CO_2$ and especially of gases as $SO_2$.

According to a preferred embodiment, the oxygen-permeable membrane may comprise, at least:
a porous support (i), ceramic or metallic, with a porosity preferably between 20 and 60%, and a thickness preferably of less than 2 mm;
a non-porous layer (ii) with a thickness preferably less than 150 μm consisting of an oxide or mixtures of oxides, which allows the simultaneous transport of oxygen ions and electronic carriers therethrough;
a catalytic activation layer (iii) described above.

According to a particular embodiment, the membrane may comprise, in addition to the layers described above, the following additional layers:
an additional porous catalytic layer (iv) between the porous support (i) and the non-porous separation layer (ii) having the function of improving the gas exchange stages. Generally, the properties of layer (iii) and layer (iv) are fairly similar, although generally the surface specific area of layer (iii) is larger;
a non-porous layer (v) q between the non-porous layer (ii) and the porous layer (iii), and it would serve to protect layer (ii) against possible degradation interactions or reactions in contact with layer (iii), or with the operating gases in contact with layer (iii). Layer (v) must allow the transport of oxygen ions and oxygen carriers while being thermo-chemically compatible with the adjacent layers and with the gases it is in contact with.

According to a preferred embodiment, the catalytic activation layer of the oxygen-permeable membrane may comprise at least one porous structure formed by particles of ceramic oxides, said particles linked to each other, conducting oxygen ions and electronic carriers, wherein the surface of said particles to the pores exposed is coated with nanoparticles made of a catalyst whose composition has the following formula:

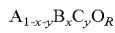

$$A_{1-x-y}B_xC_yO_R$$

wherein
A may be selected from Ti, Zr, H, lanthanide metals and combinations thereof, preferably Zr, Pr, Ce and combinations thereof;
B and C are metals selected from Al, Ga, Y, Sc, B, Nb, Ta, V, Mo, W, Re, Mn, Sn, Pr, Sm, Tb, Yb, Lu and combinations thereof, preferably Al, Ga, Y, Sc, Nb, Mo, W, Pr, Sm and combinations thereof;
A must always be different from B.
$0.01 \leq x \leq 0.5$;
$0 \leq y \leq 0.3$ Furthermore, said catalytic membrane activating layer may have a thickness preferably comprised between 5 and 100 μm, a porosity preferably comprised between 10 and 60%, and pores with an average size of preferably comprised between 0.1 and 5 μm, and a content of catalyst supported on the porous structure preferably between 0.5 and 10% by weight of said porous structure.

Also, the particles forming the porous structure may have an average grain size, preferably comprised between 0.2 and 5 μm.

According to a preferred embodiment of the invention, the porous structure of the membrane catalytic activation layer may be formed of mixtures of particles having two different compositions and crystalline phases.

A particular embodiment would be a membrane whose catalytic activation layer is formed by a porous structure formed by mixtures of particles having two distinct compositions and crystalline phases:
a first phase consisting of partially substituted cerium oxide, preferably 10-30% molar, with at least one element selected from among Zr, Gd, Pr, Sm, Nd, Er, Tb and combinations thereof, preferably Gd, Sm, Tb and combinations thereof, and has crystalline structure of the florite type, and has an ionic conductivity greater than 0.001 S/cm under operating conditions;
a second phase comprising a mixed oxide having a spinel structure, comprising at least one metal selected from Fe, Ni, Co, Al, Cr, Mn and combinations thereof, preferably Fe, Ni, Co, Mn And combinations thereof, and has a total conductivity greater than 0.05 S/cm under operating conditions.

Another particular embodiment would be a membrane whose catalytic activation layer is formed by a porous structure formed by mixtures of particles having two distinct compositions and crystalline phases:
a first phase comprising cerium oxide partially substituted (10-30% molar) by at least one element selected from Zr, Gd, Pr, Sm, Nd, Er, Tb and combinations thereof, preferably Gd, Sm, Tb and combinations thereof, and has a crystalline structure of the florite type, and has an ionic conductivity greater than 0.001 S/cm under operating conditions;
a second phase comprising a mixed oxide with perovskite type structure, comprising at least one metal selected from lanthanides, Fe, Ni, Co, Cr, Mn and combinations thereof, preferably between Fe, Mn and combinations thereof, and has a total conductivity greater than 0.05 S/cm under operating conditions.

The present invention further relates to the process of obtaining the oxygen-permeable membrane comprising the catalytic activation layer.

According to a preferred embodiment, the process of obtaining an oxygen-permeable membrane described above and comprising the catalytic activation layer may comprise at least the following steps:
a) forming the porous support (i) by a technique selected from uniaxial or isostatic pressing, extrusion or calendering, tape casting, conventional casting, dip coating, spin coating, roller coating or silk-screen printing, physical vapor deposition, sputtering, electron beam, etc., spraying of suspensions, and/or thermal spraying, including plasma spraying and spray pyrolysis; 3D printing, stereolithography, injection and combinations thereof,
b) forming the non-porous layer (ii) by a technique preferably selected from uniaxial or isostatic pressing; extrusion or calendering; tape casting, conventional casting, dip coating, spin coating, roller coating or silk-screen printing; physical vapor deposition sputtering, electron beam (electron beam), etc., atomization; airbrushing; spraying of suspensions; and/or thermal spraying, including plasma spraying and spray pyrolysis; 3D printing, stereolithography, injection, inkjet printing and combinations thereof,
c) coating the surface of the non-porous separation layer (ii) with a material preferably comprising ceramic oxide particles which conduct oxygen ions and electronic carriers by a technique selected preferably from nebulization, atomization, thermal or pyrolytic atomization, airbrushing, dip coating, spin coating, roller coating, silk screen printing, technique of chemical or physical vapor deposition (CVD-PVD), including sputtering, EB-PVD or PLD, plasma spraying printing by inkjet and thermal spraying, and combinations thereof, d) incorporating the catalyst into the particles surface of the porous structure that covers the non-porous separation layer (ii) by a technique preferably selected from impregnation or infiltration of liquid solutions of precursors of the metals comprised in the final catalyst composition; infiltration of a nanoparticle dispersion of the catalyst; deposition in vapor phase by PVD or CVD techniques and combinations thereof.

According to a preferred embodiment, the step of incorporating the catalyst (d) could be carried out in 2 steps, i.e. introducing a first element (A), and then, at least a second element (B) or two more elements (B) and (C) using the techniques described above.

In addition, according to a particular embodiment of the process of obtaining the membrane, it may further comprise a heat treatment step at temperatures between 900 and 1250° C. between steps c and d in order to remove the organic matter present in the deposited layer in (c) and sintering and chemically connecting the ceramic particles with each other and with the underlying non-porous layer.

According to another particular embodiment, optionally, a final heat treatment step may be carried out at temperatures comprised between 650 and 1100° C.

According to a particular embodiment, the porous support materials (i) may have variable geometry and comprise materials resistant to high temperatures and mechanically and chemically compatible with the materials of the selective nonporous separation layer (ii). Examples of such materials may be, without limitation: magnesium oxide, aluminum and magnesium spinels, cerium oxide doped with at least one lanthanide metal, zirconium oxide doped with at least one of the following elements Y, Mg, Sc or a lanthanide metal, titanium oxide, aluminum nitride, refractory alloys/superalloys.

Also object of the present invention is the use of the catalytic activation layer described above for the manufacture of oxygen-permeable membranes.

Also object of the present invention is the use of the oxygen-permeable membranes described above which comprise the catalytic activation layer for the generation of a $O_2$-rich stream.

These oxygen-permeable membranes are especially suitable for generating the oxygen fed in oxy-combustion processes and in contact with gases having $CO_2$ in concentrations higher than 300 ppm and $SO_2$ in concentrations higher than 5 ppm.

According to a particular embodiment, the generated stream $O_2$ may have a purity greater than 99% by volume.

According to another particular embodiment, the process wherein the membrane is used comprises a entrainment gas of the permeated $O_2$. This entrainment gas may preferably have a $SO_2$ content, preferably greater than 5 ppm.

The membrane feed streams that are used are oxygen rich ones. A non-limiting example of the feed stream may be compressed air.

According to a particular embodiment, said feed stream has a $SO_2$ content greater than 5 ppm.

According to a preferred embodiment, the membranes described can be used in an integrated manner in an oxy-combustion system or systems comprising oxygen-enriched combustion stages, as described in FIG. 1.

Throughout the description and claims the word "comprises" and its variants are not intended to exclude other technical features, additive components or steps. Other objects, advantages and features of the invention will be apparent to those skilled in the art in part from the description and in part from the practice of the invention. The following examples are provided by way of illustration, and are not intended to be limiting of the present invention.

EXAMPLES

Example 1

Figure 1:
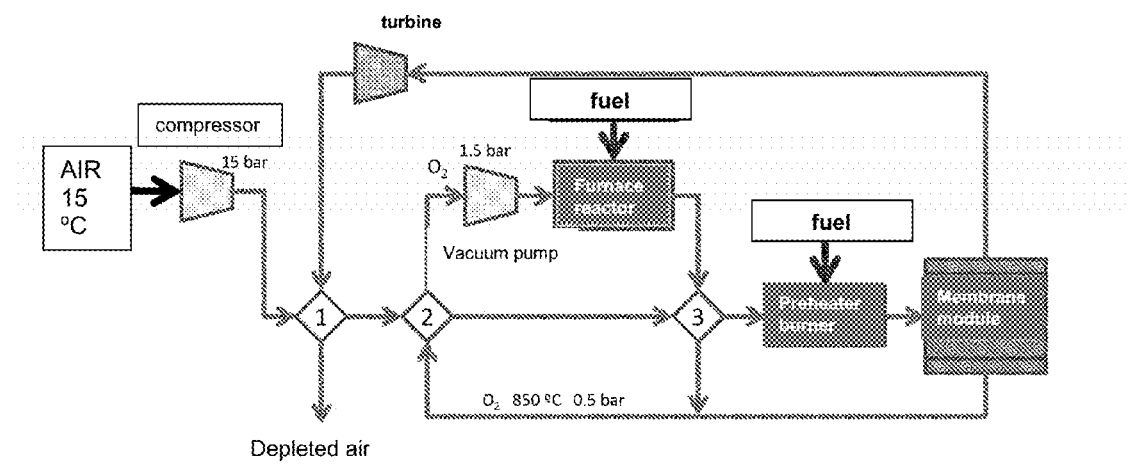
FIG. 1. Shows an oxy-combustion system provided with a $O_2$ production unit by means of ion transport membranes. The system uses vacuum in the permeate chamber of the module and different heat exchangers (1), (2) and (3)
Figure 2:
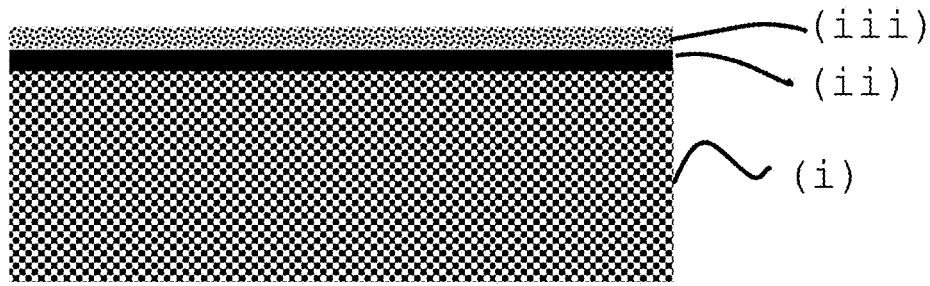
FIG. 2 shows a simplified representation of a membrane with (i) a porous support, (ii) a selective separation non-porous layer and (iii) a catalytic layer.
Figure 3:
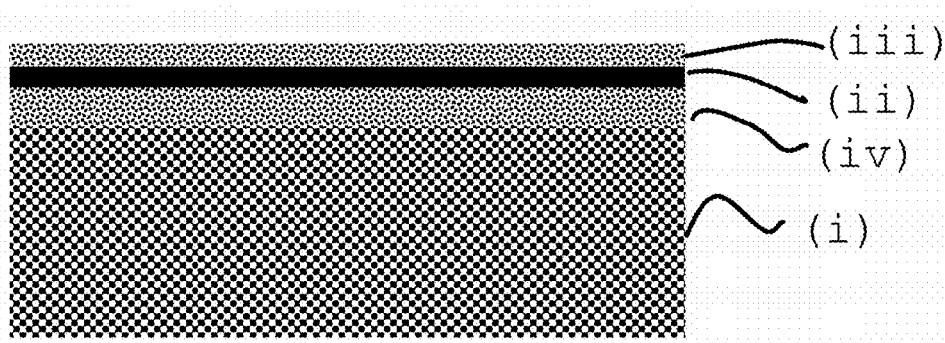
FIG. 3 shows a simplified representation of a membrane with (i) a porous support, (iv) an intermediate catalytic layer, (ii) a selective separation nonporous layer and (iii) an upper catalytic layer.
Figure 4:
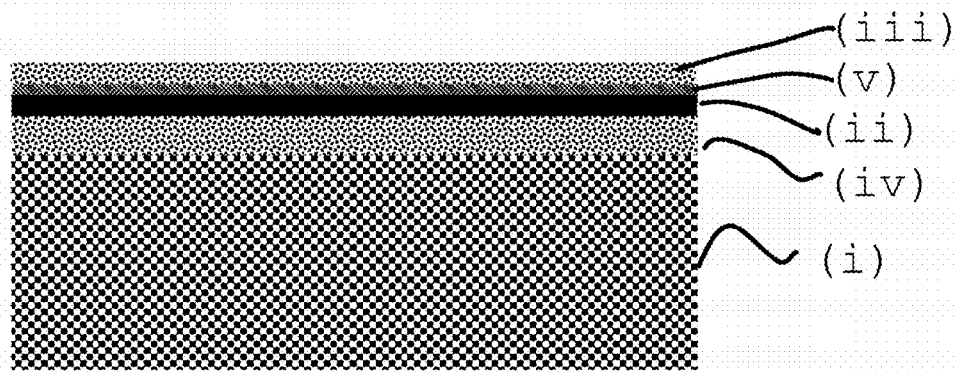
FIG. 4 shows a simplified representation of a membrane with (i) a porous support, (iv) an intermediate catalytic layer, (ii) a non-porous selective separation layer, (v) a second nonporous separation and protection layer and (iii) an upper catalytic layer.
Figure 5:
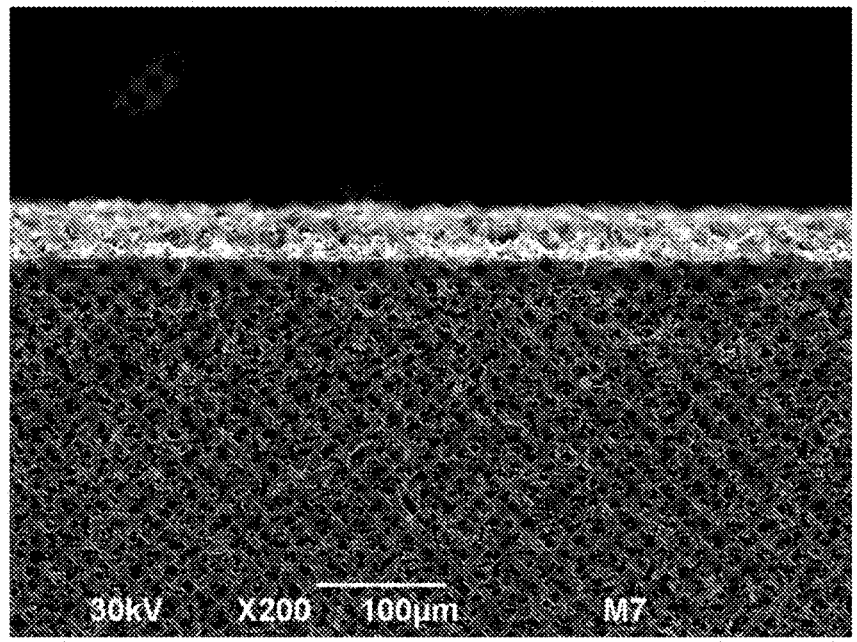
FIG. 5 shows a scanning electron microscope image of a cross-section of an oxygen-permeable ceramic membrane having (i) a porous support, (ii) a selective separation nonporous layer and (iii) a catalytic layer.
Figure 6:
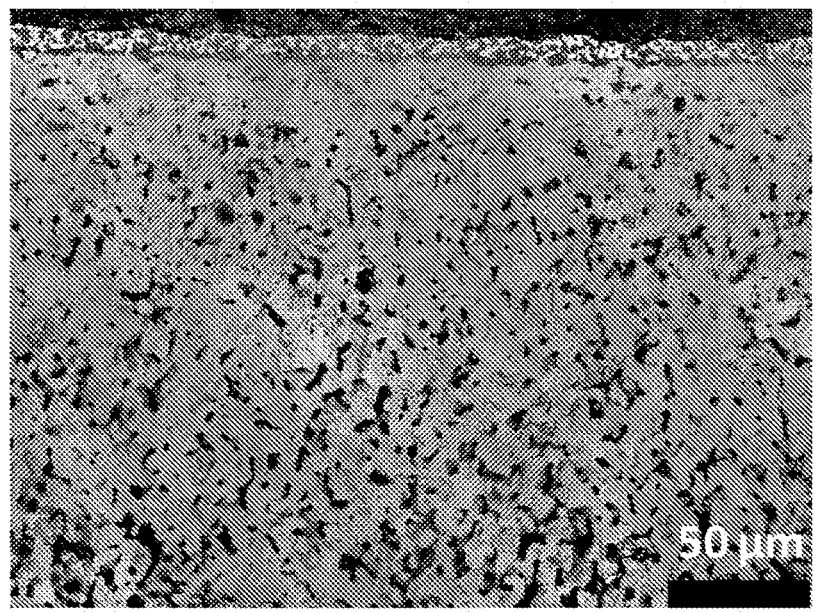
FIG. 6 shows a scanning electron microscope image of a cross-section of an oxygen-permeable ceramic membrane having (i) a porous carrier, (ii) a non-porous selective separation layer, (v) a second nonporous separation and protection layer and (iii) a catalytic layer.

A $Fe_2NiO_4$—$Ce_{0.8}Tb_{0.2}O_{2-\delta}$ (NFO-CTO) composite material in a 1:1 volumetric ratio between both crystalline phases is prepared by the method called Pechini. This method consists in dissolving the precursors of the metals, in this case nitrates, in an aqueous solution containing citric acid in a 2:1 molar ratio with respect to the metallic cations. The water in the solution is evaporated and the resulting residue is calcined at 800° C. in air. NFO-CTO is a composite material that has mixed conductivity of ions and electronic carriers. The material obtained is used to prepare serigraphic inks containing terpineol and ethylcellulose. Subsequently, two layers of NFO-CTO composite are deposited on discs of an ionic conductor ($Ce_{0.2}Gd_{0.2}O_{1.9}$, CGO) by calcining at 1000° C. and obtaining porous structures composed of NFO-CTO perfectly adhered to the surface of the CGO disc. Said disc is obtained by uniaxial pressing of commercial powder (Treibacher, Austria) and later calcined at 1500° C., and the disc is given a final flat shape by sanding and polishing.

Example 2

Sample prepared in the same manner as Example A, but to which an aqueous solution of Ce precursors (nitrates) has been infiltrated after calcination of the NFO-CTO porous substrate. Such infiltration is performed by adding a specific volume of the precursor solution in each porous layer so that the added catalyst charge is known. Subsequent to the infiltration, it is calcined at 700° C. in such a way that the catalyst is deposited in its active form.

Example 3

Sample prepared in the same manner as Example B, but infiltrating on this occasion a precursor solution of Pr nitrate.

Example 4

Sample prepared in the same manner as Example B, but infiltrating on this occasion a Sm nitrate precursor solution.

Example 5

Sample prepared in the same manner as Example B, but infiltrating on this occasion a precursor solution of Tb nitrate.

Example 6

Sample prepared in the same manner as Example B, but infiltrating on this occasion a precursor solution of Co nitrate

Example 7

Sample prepared in the same manner as Example B, but infiltrating on this occasion a precursor solution of Nb oxalate.

Example 8

Sample prepared in the same manner as Example B, but infiltrating on this occasion an ammonium heptamolybdate precursor solution.

Example 9

Sample prepared in the same manner as Example B, but infiltrating on this occasion a precursor solution of zirconyl nitrate.

Example 10

Sample prepared in the same manner as Example B, but infiltrating on this occasion an Al nitrate precursor solution.

Example 11

Sample prepared in the same manner as Example C, but adding, on this occasion, to this solution 20% by volume of the precursor solution of Example J, consequently adding a molar charge of 80% of Pr and 20% Al.

Example 12

Sample prepared in the same manner as Example B, but adding, on this occasion, to this solution 20% by volume of the precursor solution in Example B, consequently adding a molar charge of 50% of Pr and 50% Ce.

In order to carry out the electrochemical study on each of the materials of the previous examples, an experimental assembly constructed in quartz, capable of resisting the high temperatures of the study (850° C.) has been arranged.

The electrochemical characterization by impedance spectroscopy allows to know the effectiveness in the activation of gaseous oxygen, under severe conditions close to its use in oxygen membranes in oxy-combustion processes, of the catalytic layer prepared according to the previous examples. This electrochemical characterization consists of the analysis of the resistive characteristics of the materials by means of the voltammetric impedance spectroscopy method. With this analysis it is possible to characterize the electrochemical properties under different temperature conditions, and under different atmospheres (in the presence of $CO_2$ and $SO_2$).

For this purpose, a ceramic material that is conductor of oxygen-ions is arranged in the form of a disk, on which mixed porous layers of oxygen ions and electron carriers with thicknesses around 30 μm have been deposited, and on which different catalysts have been infiltrated, said catalyst being object of study. To carry out the measurements, the sample is placed inside the quartz assembly, connecting to each side, and in such a way that current collectors of a highly conductive material are in contact with the porous catalytic layers.

Two catalytic porous layers of the reference material are applied on each side of the ceramic disc by a silk screen printing technique. Subsequently, it is calcined at 1000° C. to consolidate the bonding of the layers to the disc and for the support porous structure to remain stable.

For each characterization the addition of a catalyst to the porous structure is taken into account, said addition is made by infiltration of the considered elements, from solutions of precursor compounds. Said infiltrations are performed by adding a specific volume to each porous substrate, being this volume the same for each of the catalysts studied, so that the same charge of matter is always added. Subsequently a calcination of the precursors is carried out, in such a way that the catalysts are infiltrated into their active forms (usually oxides or elemental species).

The results of the study are shown in Table 1, which shows the polarization resistance in ohms per square centimeter ($\Omega$-$cm^2$) obtained for each of the examples at 850° C. after a stabilization of 10 hours under each condition depending on the atmospheres to which it has been subjected, including the study in air, $CO_2$ with (5%) $O_2$, and $CO_2$ with (5%) $O_2$ and 250 ppm of $SO_2$. The catalytic activity is better the lower the polarization resistance. While different examples show an improvement over the non-infiltrated porous structure (Example A) under conditions of absence of $SO_2$, only in three compositions is it possible to obtain an improvement, in some cases a substantial one, over Example A. Said examples, according to the present invention are those wherein the catalyst consists of Ce, but especially those wherein two metals were combined in the catalyst, examples K (Pr—Al) and L (Ce—Pr). In the case of the Pr—Al combination, a metal with high redox catalytic activity was combined under conditions of absence of $SO_2$ and a promoter of this activity and that had acidity under operating conditions, and allowed to decrease the adsorption of $SO_2$ and its consequent damaging effect in the catalytic activity. The case of the combination Ce—Pr is analogous, the Pr with high catalytic activity in air and Ce with more acidity and also relevant catalytic activity were combined. Other possible examples of catalysts following this concept would be combinations such as Pr—Ga, Pr—Nb, Pr—W, Pr—Mo, Ce—Al, Ce—Y, Ce—Pr—Al, Cs—Sm—Sm—Ga, etc.

TABLE 1

| Example (catalyst) | 21% O₂ in N₂ | 5% O₂ in N₂ | 5% O₂ in CO₂ | 5% O₂ in CO₂ and 250 |
|---|---|---|---|---|
| A (without impregnating) | 1.85 | 2.69 | 2.71 | 7.09 |
| B (Ce) | 1.10 | 1.31 | 1.33 | 3.83 |
| C (Pr) | 0.18 | 0.88 | 1.15 | 5.27 |
| D (Sm) | 0.96 | 1.25 | 1.31 | 6.96 |
| E (Tb) | 0.52 | 0.82 | 0.91 | 8.70 |
| F (Co) | 0.47 | 0.76 | 0.84 | 10.34 |
| G (Nb) | 5.81 | 8.91 | 9.47 | 12.72 |
| H (Mo) | 16.69 | 22.23 | 23.42 | 24.11 |
| I (Zr) | 1.19 | 1.51 | 1.56 | 5.38 |
| J (Al) | 2.01 | 2.82 | 2.92 | 9.63 |
| K (Pr—Al) | 0.22 | 0.34 | 0.35 | 3.33 |
| L (Pr—Ce) | 0.25 | 0.35 | 0.38 | 2.42 |

Thus, it has been possible to obtain a high catalytic activity for the activation of gaseous oxygen in oxygen transport membranes in gases containing 250 ppm of $SO_2$ using the catalytic layer composed of (1) a porous structure made of a ceramic material having mixed conductivity with oxygen ions and electronic carriers, with adequate porosity and connection between its particles and the underlying membrane and with chemical stability against $SO_2$ under the described operating conditions, and (2) a catalyst in the form of nanoparticles dispersed on the surface of the prior porous structure, having a composition as described in the preceding paragraph.

Example 13

An NFO-CTO membrane obtained by uniaxial pressing, silk screen printing and subsequent calcination at 1400° C. of precursor powder obtained by the Pechini method. Subsequently, a layer of the NFO-CTO composite is deposited by silk-screen printing, calcining at 1000° C. and remaining as a porous structure perfectly adhered to the surface of the non-porous layer. The obtained porous layer is identical to that obtained in Example A. The membrane obtained has a porous support (i), a non-porous separation layer of about 100 μm thickness (ii) and a upper porous catalytic layer (iii), according to the scheme shown in FIG. 1.

Example 14

Sample prepared in the same manner as described in Example M, but wherein the solution described in Example K has been infiltrated in both porous substrates. The porous layer obtained is identical to that obtained in Example K. The membrane obtained is in accordance with the present invention and has a porous support (i), a non-porous separation layer of about 100 μm thickness (ii) and an upper porous catalytic layer (iii), in accordance with the scheme shown in FIG. 1.

In order to evaluate the oxygen separation properties of the compounds under study, an assembly built in quartz is available to analyze the behavior of different ceramic membranes.

The quartz assembly consists of a tube with two chambers separated by a ceramic membrane, there being no point of communication between the two chambers due to the density (absence of porosity) of the membrane and the sealing made with O-rings. On the one hand, a stream rich in oxygen is fed, while on the other side an entrainment gas is circulated or the vacuum is induced. This difference in oxygen content conditions serves as the driving force for oxygen diffusion from the feed-rejection side to the permeate side. Quantifying by means of a gas chromatograph the oxygen content in the permeate stream the flow of oxygen permeating through the membrane is determined under different conditions of temperature, oxygen content in the feed chamber and aggressive atmospheres in the permeate (presence of $CO_2$ and $SO_2$).

Oxygen permeation was studied on membranes according to Examples M and N. Permeation tests and catalytic studies were carried out on disc-shaped membranes of 15 mm diameter and about 1 mm thickness. The reaction temperature is controlled by a thermocouple close to the membrane. The permeated gas stream was analyzed using a micro-GC Varian CP-4900 equipped with three analysis modules: Molsieve5A, PoraPlot-Q and CP-Sil. Table 2 shows the oxygen permeation obtained in milliliters (normal conditions) per minute and square centimeter (Nml·min⁻¹·cm⁻²) for the membranes according to examples M and N in different atmospheres at 730° C. after 8 hour stabilization in each condition. The results show that the membrane according to the present invention (example N) has a much higher oxygen permeation than the membrane (example M) without catalyst infiltrated in layer (iii). The difference between the two membranes is much more important when the permeate contains $SO_2$, conditions in which the oxygen gaseous exchange becomes notably difficult, and therefore the effect of an active catalyst becomes much more important.

TABLE 2

| Example (catalyst) | Entrainment gas Ar | Entrainment gas 100% CO₂ | Entrainment gas 100% CO₂ |
|---|---|---|---|
| M (without impregnating) | 0.8 | 0.6 | 0.1 |
| N (Pr—Al) | 1.6 | 1.3 | 1.0 |

The invention claimed is:

1. A catalytic activation layer in an oxygen-permeable membrane, wherein the catalytic activation layer comprises at least one porous structure formed by particles of ceramic oxides, said particles linked to each other, conducting oxygen ions and electronic carriers, coated with nanoparticles made of a catalyst which has a composition with the following formula:

$$A_{1-x-y}B_xC_yO_R$$

wherein
A is selected from Ti, Zr, Hf, lanthanide metals and combinations thereof;
B and C are metals selected from Al, Ga, Y, Sc, B, Nb, Ta, V, Mo, W, Re, Mn, Sn, Pr, Sm, Tb, Yb, Lu and combinations thereof;
A must always be different from B,
$0.01 \leq x \leq 0.5$;
$0 \leq y \leq 0.3$; and
wherein R represents the molar content of oxygen, which is determined by the molar composition of the remaining metal elements of the composition;
and wherein said catalytic activation layer has a thickness comprised between 5 and 100 μm, a porosity comprised between 10 and 60% and pores with an average size comprised between 0.1 and 5 μm and a content of supported catalyst on the porous structure between 0.5 and 10% by weight of the porous structure.

2. The catalytic activation layer of claim 1, wherein the porous structure is made of mixtures of particles having two different compositions and crystalline phases:

a first phase which is made of cerium oxide partially substituted by one element selected from the group consisting of Zr, Gd, Pr, Sm, Nd, Er, Tb and combinations thereof, and has crystalline structure of the fluorite type, and has an ionic conductivity greater than 0.001 S/cm under operating conditions;

a second phase comprising a mixed oxide with a spinel type structure, comprising at least one metal selected from the group consisting of Fe, Ni, Co, Al, Cr, Mn and combinations thereof, and has a total conductivity greater than 0.05 S/cm under operating conditions.

3. The catalytic activation layer according to claim 1, wherein the porous structure consists of mixtures of particles having two different compositions and crystalline phases:

a first phase comprising cerium oxide partially substituted by an element selected from the group consisting of Zr, Gd, Pr, Sm, Nd, Er, Tb and combinations thereof, has a crystalline structure of the fluorite type, and has ionic conductivity greater than 0.001 S/cm under operating conditions;

a second phase comprising a mixed oxide with perovskite type structure comprising at least one metal selected from the group consisting of lanthanides, Fe, Ni, Co, Cr, Mn and combinations thereof and has a total conductivity greater than 0.05 S/cm under operating conditions.

4. A process for producing a catalytic activation layer described in claim 1 comprising at least one step of incorporating the catalyst into the particles surface of the porous structure by a technique selected from the group consisting of:

impregnation of liquid solutions or precursors of metals comprised in the catalyst composition of formula $A_{1-x-y}B_xC_yO_R$;

infiltration of liquid solutions of precursors of the metals comprised in the catalyst composition of formula $A_{1-x-y}B_xC_yO_R$;

infiltration of a nanoparticle dispersion of the catalyst;

deposition in vapor phase by physical vapor deposition techniques;

deposition in vapor phase by chemical vapor deposition techniques; and combinations thereof.

5. A process for producing the catalytic activation layer according to claim 4, further comprising a thermal treatment stage at temperatures comprised between 650 and 1100° C. after the incorporation of the catalyst at least in the catalytic activation layer (iii).

6. An oxygen-permeable membrane, comprising, at least:

a porous ceramic or metallic support (i) with a porosity between 20 and 60%, and a thickness of less than 2 mm;

a non-porous layer (ii) with a thickness of less than 150 μm made of an oxide or mixtures of oxides that allows the simultaneous transport of oxygen ions and electronic carriers through it;

said catalytic activation layer (iii), and produced according to the process of claim 4.

7. A process for producing the oxygen-permeable membrane of claim 6, comprising at least the following steps:

a) forming the porous support (i) by a technique selected from the group consisting of uniaxial pressing, isostatic pressing, extrusion, calendering, tape casting, slip casting, dip coating, spin coating, roller coating, silk-screen printing, physical vapor deposition, spraying of suspensions, 3D printing, stereolithography, injection and combinations thereof;

b) forming the non-porous layer (ii) by a technique selected from the group consisting of uniaxial pressing, isostatic pressing, extrusion, calendering, tape casting, slip casting, dip coating, spin coating, roller coating or silk-screen printing, physical vapor deposition, spraying of suspensions, 3D printing, stereolithography, injection, inkjet printing and combinations thereof;

c) coating the surface of the non-porous separation layer (ii) with a material comprising ceramic oxide particles which conduct oxygen ions and electronic carriers by a technique selected from the group consisting of nebulization, atomization, thermal atomization, pyrolytic atomization, airbrushing, dip coating, spin coating, roller coating, silk screen printing, technique of chemical vapor deposition, physical vapor deposition, printing by inkjet and thermal spraying, and combinations thereof;

d) incorporating the catalyst into the particles surface of the porous structure that covers the non-porous separation layer (ii) by a technique selected from the group consisting of:

impregnation of liquid solutions of precursors of metals comprised in the catalyst composition of formula $A_{1-x-y}B_xC_yO_R$;

infiltration of liquid solutions of precursors of metals comprised in the catalyst composition of formula $A_{1-x-y}B_xC_yO_R$;

infiltration of a nanoparticle dispersion of the catalyst;

deposition in vapor phase by physical vapor deposition techniques;

deposition in vapor phase by chemical vapor deposition techniques; and combinations thereof.

8. The process for producing an oxygen-permeable membrane of claim 7, further comprising a thermal treatment step at temperatures between 900 and 1250° C. between steps c and d.

9. The process for producing an oxygen-permeable membrane of claim 7 further comprising a last step of thermal treatment at temperatures comprised between 650 and 1100° C.

10. A method of preparing an oxygen-permeable membrane comprising the step of providing said catalytic activation layer produced according to the method of claim 4, and producing oxygen-permeable membranes.

11. A method of generating an $O_2$ rich stream comprising:

providing the membrane of claim 6 or the membrane being produced by the process of claim 7 and generating an O2 rich stream.

12. The method of claim 11, wherein the generated $O_2$ stream has a purity greater than 99% by volume.

13. The method of claim 11, wherein the membrane comprises an entrainment gas for the permeated $O_2$.

14. The method of claim 13, wherein the entrainment gas has an $SO_2$ content greater than 5 ppm.

15. The method of claim 11, wherein the membrane feed stream has an $SO_2$ content greater than 5 ppm.

16. The method of claim 11, wherein the membrane is integrated in an oxy-combustion system or systems which comprise oxygen enriched combustion stages.

* * * * *